(12) United States Patent
Joseph et al.

(10) Patent No.: US 11,417,116 B2
(45) Date of Patent: Aug. 16, 2022

(54) VEHICULAR TRAILER ANGLE DETECTION SYSTEM

(71) Applicant: Magna Electronics Inc., Auburn Hills, MI (US)

(72) Inventors: Harold E. Joseph, Brampton (CA); Joshua Teichroeb, Mississauga (CA); Alexander Velichko, Toronto (CA); Jyothi P. Gali, Rochester Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 307 days.

(21) Appl. No.: 16/850,300

(22) Filed: Apr. 16, 2020

(65) Prior Publication Data
US 2020/0334475 A1    Oct. 22, 2020

Related U.S. Application Data

(60) Provisional application No. 62/836,243, filed on Apr. 19, 2019.

(51) Int. Cl.
*G06V 20/58* (2022.01)
*B60R 1/00* (2022.01)
(Continued)

(52) U.S. Cl.
CPC ............ *G06V 20/584* (2022.01); *B60R 1/002* (2013.01); *B60R 11/04* (2013.01); *B62D 13/06* (2013.01);
(Continued)

(58) Field of Classification Search
CPC ........... B60R 1/00; B60R 1/002; B60R 11/04; B60R 2300/20; B60R 2300/30;
(Continued)

(56) References Cited

U.S. PATENT DOCUMENTS 5,550,677 A    8/1996  Schofield et al.
5,670,935 A    9/1997  Schofield et al.
(Continued)

OTHER PUBLICATIONS

Caup et al. "Video-based Trailer Detection and Articulation Estimation" 2013 IEEE Intelligent Vehicles Symposium (IV) Jun. 23-26, 2013, Gold Coast, Australia 6 Pages.*

*Primary Examiner* — Nathnael Aynalem
(74) *Attorney, Agent, or Firm* — Honigman LLP

(57) ABSTRACT

A trailering assist system includes a control and a camera disposed at a rear portion of a vehicle and having a field of view at least rearward of the vehicle. The control includes an image processor operable to process image data captured by the camera. The control, responsive to image processing of captured image data, transforms captured image data of the trailer hitch from a pivoting orientation of the portion of the trailer that pivots about the trailer hitch to a vertical orientation of the portion of the trailer that moves laterally across the transformed image data. The control transforms pivotal movement of the portion of the trailer about the trailer hitch to lateral movement of the trailer hitch in the transformed image data. The control determines a trailer angle of the trailer relative to the vehicle based on the lateral position of the trailer hitch in the transformed image data.

20 Claims, 5 Drawing Sheets

(51) Int. Cl.
    *B60R 11/04*    (2006.01)
    *H04N 5/225*    (2006.01)
    *B62D 13/06*    (2006.01)

(52) U.S. Cl.
    CPC ........ *H04N 5/2253* (2013.01); *B60R 2300/20* (2013.01); *B60R 2300/30* (2013.01)

(58) Field of Classification Search
    CPC ........ B60R 2300/806; B60R 2300/202; B60R 2300/205; B60R 2300/207; B60R 2300/10; B60R 2300/101; B60R 2300/102; B60R 2300/103; B60R 2300/105; B60R 1/003; B60R 2300/8086; B60R 2300/8093; B60R 2300/607; B62D 13/06; B62D 15/021; G06V 20/58; G06V 20/584; H04N 5/2253; H04N 5/2257; B60D 1/245
    USPC ......................................................... 348/148
    See application file for complete search history.

(56) References Cited

U.S. PATENT DOCUMENTS

| | | | |
|---|---|---|---|
| 5,949,331 | A | 9/1999 | Schofield et al. |
| 6,498,620 | B2 | 12/2002 | Schofield et al. |
| 6,690,268 | B2 | 2/2004 | Schofield et al. |
| 7,038,577 | B2 | 5/2006 | Pawlicki et al. |
| 7,720,580 | B2 | 5/2010 | Higgins-Luthman |
| 7,855,755 | B2 | 12/2010 | Weller et al. |
| 9,085,261 | B2 | 7/2015 | Lu et al. |
| 9,264,672 | B2 | 2/2016 | Lynam |
| 9,446,713 | B2 | 9/2016 | Lu et al. |
| 9,558,409 | B2 | 1/2017 | Pliefke et al. |
| 9,950,738 | B2 * | 4/2018 | Lu .............................. B60D 1/62 |
| 10,071,687 | B2 | 9/2018 | Ihlenburg et al. |
| 10,086,870 | B2 | 10/2018 | Gieseke et al. |
| 10,099,614 | B2 | 10/2018 | Diessner |
| 10,127,459 | B2 * | 11/2018 | Hu .............................. B60R 1/00 |
| 10,160,382 | B2 | 12/2018 | Pliefke et al. |
| 10,532,698 | B2 | 1/2020 | Potnis et al. |
| 10,552,976 | B2 | 2/2020 | Diessner et al. |
| 10,586,119 | B2 | 3/2020 | Pliefke et al. |
| 10,638,025 | B2 | 4/2020 | Gali et al. |
| 10,706,291 | B2 | 7/2020 | Diessner et al. |
| 10,733,757 | B2 | 8/2020 | Gupta et al. |
| 10,755,110 | B2 | 8/2020 | Bajpai |
| 2002/0149673 | A1 * | 10/2002 | Hirama .................. H04N 7/183 348/E7.087 |
| 2008/0044061 | A1 * | 2/2008 | Hongo ..................... B60R 1/00 382/104 |
| 2014/0063197 | A1 | 3/2014 | Yamamoto et al. |
| 2014/0085472 | A1 | 3/2014 | Lu et al. |
| 2014/0160276 | A1 | 6/2014 | Pliefke et al. |
| 2014/0267688 | A1 | 9/2014 | Aich et al. |
| 2015/0002670 | A1 | 1/2015 | Bajpai |
| 2015/0217693 | A1 * | 8/2015 | Pliefke .................. H04N 7/183 348/118 |
| 2016/0049020 | A1 | 2/2016 | Kuehnle et al. |
| 2017/0050672 | A1 | 2/2017 | Gieseke et al. |
| 2017/0174128 | A1 | 6/2017 | Hu et al. |
| 2017/0217372 | A1 | 8/2017 | Lu et al. |
| 2017/0254873 | A1 | 9/2017 | Koravadi |
| 2017/0280091 | A1 | 9/2017 | Greenwood et al. |
| 2017/0341583 | A1 | 11/2017 | Zhang et al. |
| 2018/0215382 | A1 | 8/2018 | Gupta et al. |
| 2018/0253608 | A1 | 9/2018 | Diessner et al. |
| 2018/0276838 | A1 | 9/2018 | Gupta et al. |
| 2018/0276839 | A1 | 9/2018 | Diessner et al. |
| 2019/0016264 | A1 | 1/2019 | Potnis et al. |
| 2019/0039649 | A1 | 2/2019 | Gieseke et al. |
| 2019/0042864 | A1 | 2/2019 | Pliefke et al. |
| 2019/0064831 | A1 | 2/2019 | Gali et al. |
| 2019/0118860 | A1 | 4/2019 | Gali et al. |
| 2019/0143895 | A1 | 5/2019 | Pliefke et al. |
| 2019/0241126 | A1 | 8/2019 | Murad et al. |
| 2019/0297233 | A1 | 9/2019 | Gali et al. |
| 2019/0329821 | A1 | 10/2019 | Ziebart et al. |
| 2019/0339704 | A1 * | 11/2019 | Yu ........................... G06T 7/174 |
| 2019/0347498 | A1 | 11/2019 | Herman et al. |
| 2019/0347825 | A1 | 11/2019 | Gupta et al. |
| 2020/0017143 | A1 | 1/2020 | Gali |
| 2020/0334475 | A1 | 10/2020 | Joseph et al. |
| 2020/0356788 | A1 | 11/2020 | Joseph et al. |
| 2020/0361397 | A1 | 11/2020 | Joseph et al. |
| 2020/0406967 | A1 | 12/2020 | Yunus et al. |
| 2021/0078634 | A1 | 3/2021 | Jalalmaab et al. |
| 2021/0094473 | A1 | 4/2021 | Gali et al. |
| 2021/0170820 | A1 | 6/2021 | Zhang |
| 2021/0170947 | A1 | 6/2021 | Yunus et al. |

\* cited by examiner ic # VEHICULAR TRAILER ANGLE DETECTION SYSTEM

CROSS REFERENCE TO RELATED APPLICATION

The present application claims the filing benefits of U.S. provisional application Ser. No. 62/836,243, filed Apr. 19, 2019, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties. Trailer assist systems are known that may determine an angle of a trailer hitched at a vehicle. Examples of such known systems are described in U.S. Pat. Nos. 9,085,261 and/or 6,690,268, which are hereby incorporated herein by reference in their entireties.

SUMMARY OF THE INVENTION

The present invention provides a driver assistance system or vision system or imaging system for a vehicle that utilizes a camera disposed at a rear portion of a vehicle and having a field of view exterior of the vehicle, the field of view encompassing at least a portion of a trailer hitched to the vehicle. The system also includes a control comprising an image processor operable to process image data captured by the camera, with the image data captured by the camera representative of the trailer hitched to the vehicle. The control, responsive to image processing of captured image data of a portion of the trailer hitched at the trailer hitch, transforms an image of the trailer hitch from a pivoting orientation of the portion of the trailer that pivots about the trailer hitch to a vertical orientation of the portion of the trailer that moves laterally across the transformed image. The control transforms pivotal movement of the portion of the trailer that pivots about the trailer hitch to lateral movement of the trailer hitch in the transformed image. The control determines a trailer angle of the trailer relative to the vehicle based on the lateral position of the trailer hitch in the image data.

These and other objects, advantages, purposes and features of the present invention will become apparent upon review of the following specification in conjunction with the drawings.

DESCRIPTION OF THE PREFERRED EMBODIMENTS

A vehicle and trailer maneuvering system or maneuver assist system and/or driving assist system operates to capture images exterior of the vehicle and of a trailer being towed by the vehicle and may process the captured image data to determine a path of travel for the vehicle and trailer and to detect objects at or near the vehicle and in the predicted path of the vehicle, such as to assist a driver of the vehicle in maneuvering the vehicle and trailer in a rearward direction. The vision system includes an image processor or image processing system that is operable to receive image data from one or more cameras and that may provide an output to a display device for displaying images representative of the captured image data. Optionally, the vision system may provide a display, such as a rearview display or a top down or bird's eye or surround view display or the like.

Figure 1:
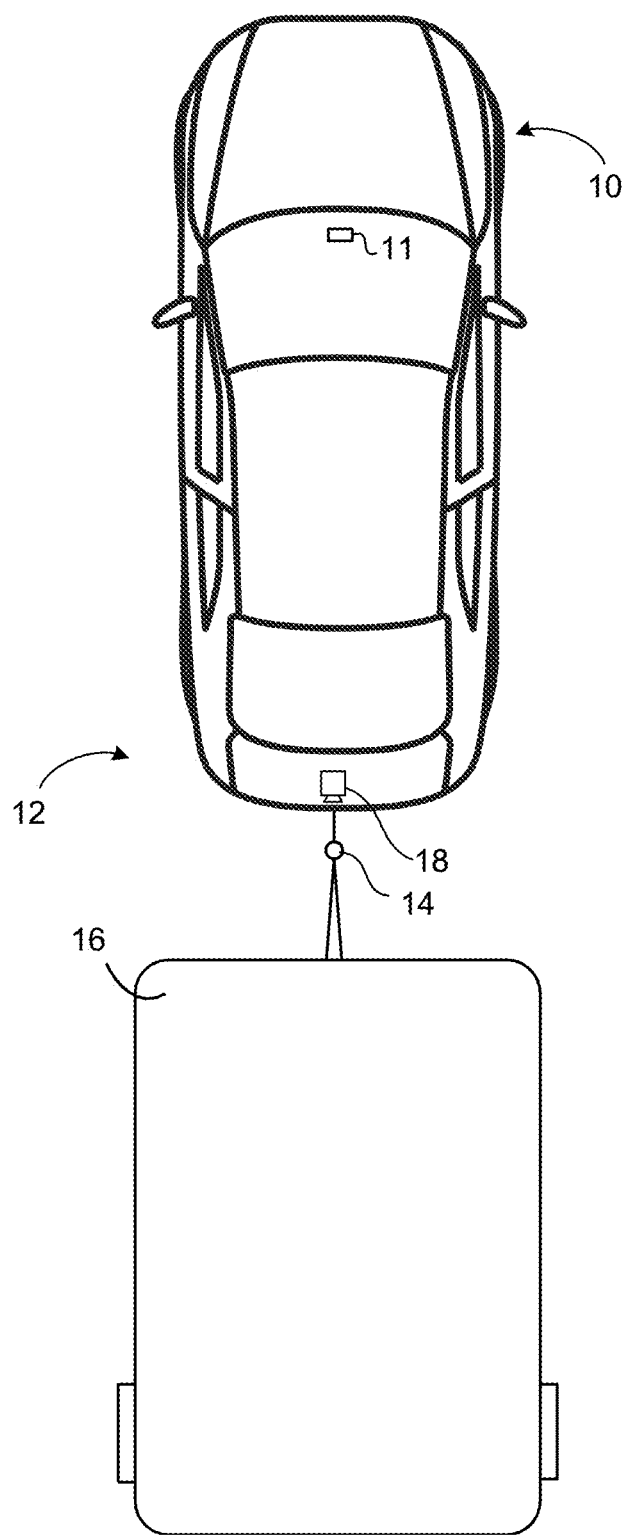
FIG. 1 is a plan view of a vehicle with a trailer assist system that is operable to steer a trailer along a trailer direction in accordance with the present invention.

Referring now to the drawings and the illustrative embodiments depicted therein, a vehicle 10 includes a trailer maneuver assist system 12 that is operable to assist in backing up or reversing the vehicle with a hitched trailer that is hitched at the rear of the vehicle via a hitch 14, and the system may maneuver the vehicle 10 and trailer 16 toward a desired or selected location. The trailer maneuver assist system 12 includes at least one exterior viewing vehicle-based imaging sensor or camera, such as a rearward viewing imaging sensor or camera 18, which captures image data representative of the scene exterior and rearward of the vehicle 10, with the field of view of the camera encompassing the hitch 14 and/or trailer 16, and with the camera 18 having a lens for focusing images at or onto an imaging array or imaging plane or imager of the camera (FIG. 1). The trailer maneuver assist system 12 includes a control 11 or electronic control unit (ECU) having electronic circuitry and associated software, with the electronic circuitry comprising a processor that is operable to process image data captured by the camera or cameras. Responsive to processing by the processor of captured image data, the ECU may detect objects or the like and/or provide displayed images at a display device for viewing by the driver of the vehicle (the control and/or display device may be part of or incorporated in or at an interior rearview mirror assembly of the vehicle, or the control and/or the display device may be disposed elsewhere at or in the vehicle). The data transfer or signal communication from the camera to the ECU may comprise any suitable data or communication link, such as a vehicle network bus or the like of the equipped vehicle.

The rearward viewing camera 18 may comprise the rear backup camera of the vehicle that captures image data during a reversing maneuver of the vehicle for display of video images derived from the captured image data for viewing by the driver of the vehicle during the reversing maneuver of the vehicle. The system may optionally include multiple exterior viewing imaging sensors or cameras, such as sideward/rearward viewing cameras at respective sides of the vehicle. Optionally, a forward viewing camera may be disposed at the windshield of the vehicle 10 and view through the windshield and forward of the vehicle 10, such as for a machine vision system (such as for traffic sign recognition, headlamp control, pedestrian detection, collision avoidance, lane marker detection and/or the like).

Object detection has become ubiquitous in vehicle vision systems. However, vision based detection of objects that move in a circular motion around a pivot (e.g., rear camera-based trailer angle detection, determining the speed of a dial in an analog speedometer, etc.) are difficult to detect as they pivot or move in the circular motion. This is because the pose, angle, and rotation of the objects alter features and feature points present at the object (and as viewed by the camera) that the vision system uses to detect the objects. The movement of these features increases the difficulty of detection of the features.

The present invention provides a system and method for warping an image around a pivot position so that, instead of moving around the pivot position, objects move laterally in the image. This approach is capable of eliminating challenges in pose and orientation due to the rotation of objects in images and video. The present invention also provides a platform to more readily detect such objects because the objects to not undergo pose and scale variance. Deformations caused from the rotation of the objects above the pivot axis are also removed.

Figures 2, 3:
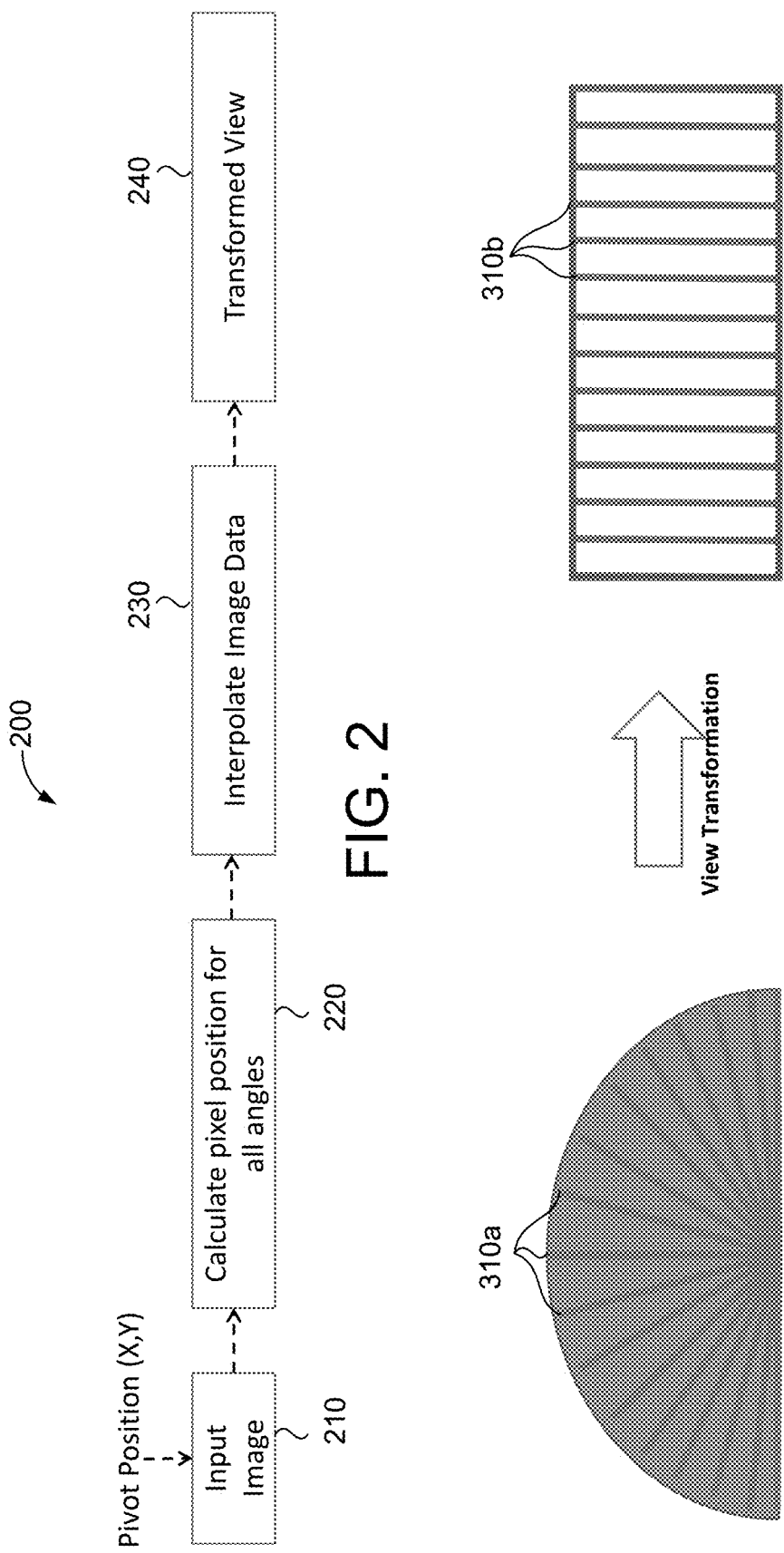
FIG. 2 is a block diagram of the trailer assist system of FIG. 1.
FIG. 3 is a plan view of another exemplary image transformation in accordance with the present invention.

The control 11 determines a pivot position of the trailer 16 (i.e., the point that the trailer 16 rotates around relative to the vehicle 10). For example, and as shown in FIG. 1, the pivot position may be at the hitch 14. The control may determine Cartesian coordinates (i.e., an X and Y coordinate) for the pivot position and may process image data representative of the trailer hitch 14 to transform an image of the trailer hitch captured by the camera 18 from an orientation pivoting around the pivot position to a vertical orientation based on the trailer angle. To transform the image, the control may receive the input image at step 210 of flowchart 200 (FIG. 2) and calculate a pixel position for one or more angles at step 220. As shown in FIG. 3, the control may calculate the pixel position for pixels at a plurality of angles 310a (e.g., every one degree or every five degrees or every ten degrees, etc.). The control may interpolate the image data at step 230 to generate the transformed view at step 240. That is, the control may transform the view such that objects that pivot around the pivot point at select angles are moved to be vertically oriented at corresponding locations 310b (FIG. 3). One or more objects may be transformed simultaneously. Using the transformed view, the control (or other processing hardware disposed at the vehicle) may more readily detect an object (e.g., a trailer or trailer hitch), extract features of that object, and determine the angle of the object (e.g., the trailer angle relative to the vehicle) based on the object's spatial location.

Figure 4:
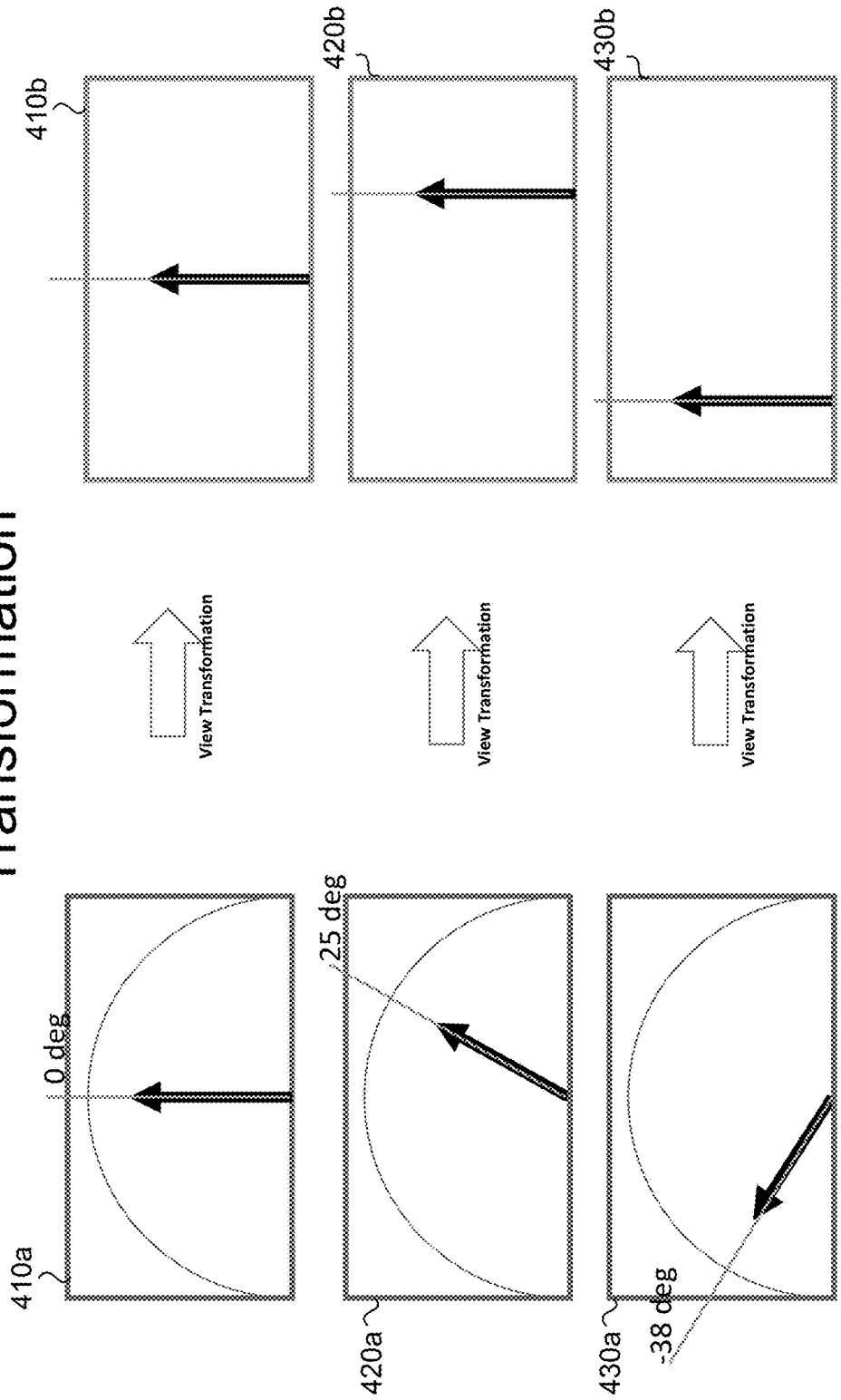
FIG. 4 is a plan view of exemplary image transformations in accordance with the present invention.

Referring now to FIG. 4, the image transformation includes transforming a view of an object that pivots around a pivot point to a vertical orientation that moves laterally along the view. For example, a view 410a with an object (e.g., the trailer) at the zero degree position (i.e., aligned with the longitudinal axis of the vehicle) may correspond to a transformed view 410b with the object oriented vertically in the center of the image. If the object rotates to the twenty-five degree position as shown at view 420a, the corresponding transformed view 420b may move the object laterally to the right (i.e., right of center) of the image. Similarly, if the object rotates to the negative thirty-eight degree position (i.e., 322 degrees) as shown at view 430a, the corresponding transformed view 430b may move the object laterally to the left (i.e., left of center) of the image.

Figure 5A:
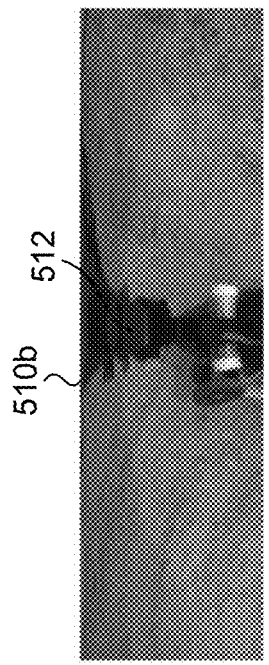
FIGS. 5A and 5B are exemplary transformations of a trailer hitch in accordance with the present invention.
Figure 5A:
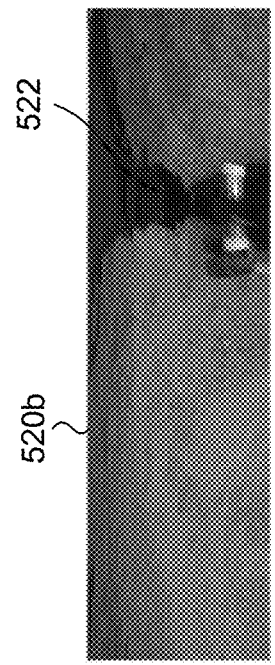
Figure 5A:
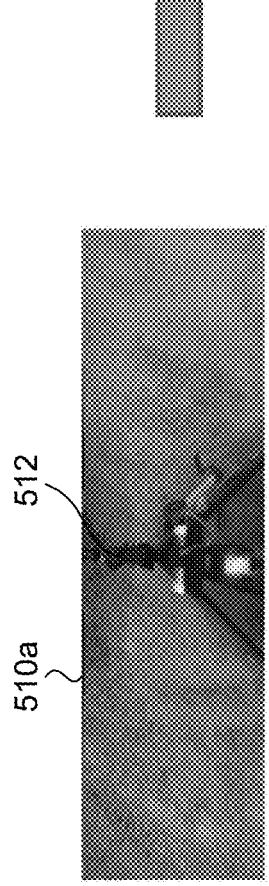
Figure 5B:
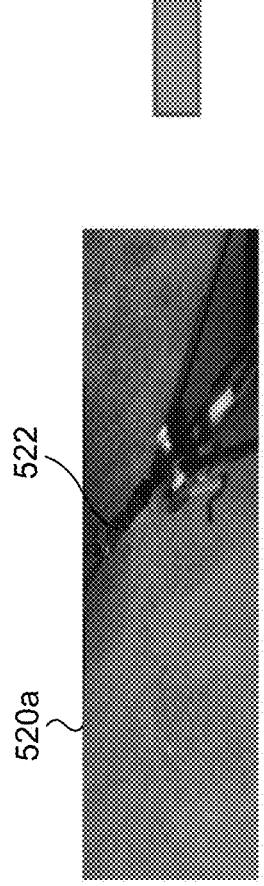

For example, as illustrated in FIGS. 5A and 5B, when an image 510a includes the trailer angle at or near zero degrees (FIG. 5A) (i.e., the angle between the trailer and the vehicle about the pivot position 512 is at or near zero degrees relative to the longitudinal axis of the vehicle), the image 510a may be transformed to put the pivot position 512 (e.g., the trailer hitch) and the trailer in the center of the transformed image 510b. In another example, when the trailer pivots to the right in the image 520a (FIG. 5B), the transformed image 520b shows the trailer hitch 522 and trailer moved laterally to the right.

Figures 6A, 6B, 6C:
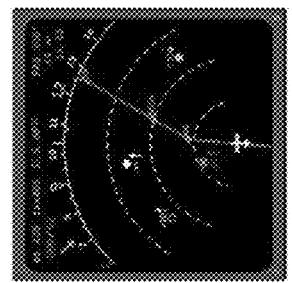
FIGS. 6A-6C are exemplary pivoting images that may be transformed by the system of FIG. 1.

Thus, the system of the present invention provides for warping an image around a pivot position so that instead of moving or pivoting around the pivot position (i.e., radial movement around the pivot position) in the image, objects move laterally across the image. This is advantageous for any application that requires the detection of objects moving around a pivot position. For example, and with reference to FIGS. 6A-6C, such applications include, aside from rear camera-based trailer angle detection, determining the speed of a dial in an analog speedometer or other meter (FIG. 6A), re-projecting a radar beacon system for air traffic control (FIG. 6B), traffic collision avoidance systems in aircraft (FIG. 6C), and the like.

Therefore, the trailer assist system determines when a trailer is hitched at a vehicle and determines the angle of the trailer relative to the vehicle. Because the system knows that the trailer is hitched and will pivot about the trailer hitch at the rear of the vehicle, the system determines the pivot point and transforms the pivoting movement of the trailer to lateral translational movement of the trailer based on the pivot point in the image data to ease processing of the image data in determining the trailer angle, which may be used in assisting the ECU in controlling the vehicle during a reversing maneuver of the vehicle and trailer.

The system may utilize aspects of the trailering assist systems or trailer angle detection systems or trailer hitch assist systems described in U.S. Pat. No. 6,690,268, and/or U.S. Publication Nos. US-2020-0017143; US-2019-0297233; US-2019-0347825; US-2019-0118860; US-2019-0064831; US-2019-0042864; US-2019-0039649; US-2019-0143895; US-2019-0016264; US-2018-0276839; US-2018-0276838; US-2018-0253608; US-2018-0215382; US-2017-0254873; US-2017-0217372; US-2017-0050672; US-2015-0217693; US-2014-0160276; US-2014-0085472 and/or US-2015-0002670, and/or U.S. provisional applications, Ser. No. 62/844,834, filed on May 8, 2019, and/or Ser. No. 62/868,051, filed on Jun. 28, 2019, which are all hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A trailering assist system for a vehicle, the trailering assist system comprising:

a camera disposed at a rear portion of a vehicle equipped with the trailering assist system and having a field of view exterior and at least rearward of the vehicle, wherein, with a trailer hitched at a trailer hitch of the vehicle, at least a portion of the trailer hitched at the trailer hitch is within the field of view of the camera;

a control comprising electronic circuitry and associated software;

wherein the electronic circuitry of the control comprises an image processor operable to process image data captured by the camera, wherein the image data captured by the camera is representative of at least the portion of the trailer hitched at the trailer hitch of the vehicle;

wherein captured image data representative of the portion of the trailer hitched at the trailer hitch is processed at the control to transform captured image data of the trailer hitch from a pivoting orientation of the portion of the trailer that pivots about the trailer hitch to a vertical orientation of the portion of the trailer that moves laterally across the transformed image data, and wherein the control transforms pivotal movement of the portion of the trailer about the trailer hitch to lateral movement of the trailer hitch in the transformed image data; and wherein the control, responsive to processing of the transformed image data, determines a trailer angle of the trailer relative to the vehicle based on a lateral position of the trailer hitch in the transformed image data.

2. The trailering assist system of claim 1, wherein the control, responsive to image processing of image data captured by the camera, calculates pixel positions for pixels at a plurality of angles relative to the trailer hitch.

3. The trailering assist system of claim 2, wherein the control calculates pixel positions for the trailer angle of the trailer relative to the vehicle at an increment selected from the group consisting of (i) every ten degrees, (ii) every five degrees and (iii) every one degree.

4. The trailering assist system of claim 1, wherein lateral movement of the trailer hitch to a right side of a center of the transformed image data corresponds to an increase in the determined trailer angle of the trailer relative to the vehicle.

5. The trailering assist system of claim 1, wherein lateral movement of the trailer hitch to a left side of a center of the transformed image data corresponds to a decrease in the determined trailer angle of the trailer relative to the vehicle.

6. The trailering assist system of claim 1, wherein the trailering assist system utilizes the laterally moving trailer hitch in the transformed image data to assist in controlling the vehicle during a reversing maneuver of the vehicle and trailer.

7. The trailering assist system of claim 1, wherein the control determines Cartesian coordinates for the trailer hitch.

8. The trailering assist system of claim 1, wherein, when the trailer angle of the trailer relative to the vehicle is zero degrees, the trailer hitch is located at the center of the transformed image data.

9. The trailering assist system of claim 1, wherein the control interpolates the image data to transform the image data representative of the trailer hitch.

10. The trailering assist system of claim 1, wherein the control extracts features of the portion of the trailer hitched at the trailer hitch to determine the trailer angle of the trailer relative to the vehicle.

11. The trailering assist system of claim 1, wherein the camera comprises a rear backup camera of the vehicle.

12. A trailering assist system for a vehicle, the trailering assist system comprising:
a camera disposed at a rear portion of a vehicle equipped with the trailering assist system and having a field of view exterior and at least rearward of the vehicle, wherein, with a trailer hitched at a trailer hitch of the vehicle, at least a portion of the trailer hitched at the trailer hitch is within the field of view of the camera;
a control comprising electronic circuitry and associated software;
wherein the electronic circuitry of the control comprises an image processor operable to process image data captured by the camera, wherein the image data captured by the camera is representative of at least the portion of the trailer hitched at the trailer hitch of the vehicle;
wherein the control, responsive to image processing of image data representative of the portion of the trailer hitched at the trailer, calculates pixel positions for pixels at a plurality of angles relative to the trailer hitch;
wherein the control, responsive to calculating pixel positions for pixels, transforms captured image data of the trailer hitch from a pivoting orientation of the portion of the trailer that pivots about the trailer hitch to a vertical orientation of the portion of the trailer that moves laterally across the transformed image data, and wherein the control transforms pivotal movement of the portion of the trailer about the trailer hitch to lateral movement of the trailer hitch in the transformed image data;
wherein the control, responsive to processing of the transformed image data, determines a trailer angle of the trailer relative to the vehicle based on a lateral position of the trailer hitch in the transformed image data; and
wherein the trailering assist system utilizes the laterally moving trailer hitch in the transformed image data to assist in controlling the vehicle during a reversing maneuver of the vehicle and trailer.

13. The trailering assist system of claim 12, wherein the control calculates pixel positions for the trailer angle of the trailer relative to the vehicle at an increment selected from the group consisting of (i) every ten degrees, (ii) every five degrees and (iii) every one degree.

14. The trailering assist system of claim 12, wherein lateral movement of the trailer hitch to a right side of a center of the transformed image data corresponds to an increase in the determined trailer angle of the trailer relative to the vehicle, and wherein lateral movement of the trailer hitch to a left side of a center of the transformed image data corresponds to a decrease in the determined trailer angle of the trailer relative to the vehicle.

15. The trailering assist system of claim 12, wherein the control determines Cartesian coordinates for the trailer hitch.

16. The trailering assist system of claim 12, wherein, when the trailer angle of the trailer relative to the vehicle is zero degrees, the trailer hitch is located at the center of the transformed image data.

17. The trailering assist system of claim 12, wherein the control extracts features of the portion of the trailer hitched at the trailer hitch to determine the trailer angle of the trailer relative to the vehicle.

18. A trailering assist system for a vehicle, the trailering assist system comprising:
a rear backup camera disposed at a rear portion of a vehicle equipped with the trailering assist system and having a field of view exterior and at least rearward of the vehicle, wherein, with a trailer hitched at a trailer hitch of the vehicle, at least a portion of the trailer hitched at the trailer hitch is within the field of view of the rear backup camera;
a control comprising electronic circuitry and associated software;
wherein the electronic circuitry of the control comprises an image processor operable to process image data captured by the rear backup camera, wherein the image data captured by the rear backup camera is representative of at least the portion of the trailer hitched at the trailer hitch of the vehicle;
wherein captured image data representative of the portion of the trailer hitched at the trailer hitch is processed at the control to transform captured image data of the trailer hitch from a pivoting orientation of the portion of the trailer that pivots about the trailer hitch to a vertical orientation of the portion of the trailer that moves laterally across the transformed image data, and wherein the control transforms pivotal movement of the portion of the trailer about the trailer hitch to lateral movement of the trailer hitch in the transformed image data;
wherein the control, responsive to processing of the transformed image data, determines a trailer angle of the trailer relative to the vehicle based on a lateral position of the trailer hitch in the transformed image data; and
wherein the trailering assist system utilizes the laterally moving trailer hitch in the transformed image data to assist in controlling the vehicle during a reversing maneuver of the vehicle and trailer.

19. The trailering assist system of claim 18, wherein, when the trailer angle of the trailer relative to the vehicle is zero degrees, the trailer hitch is located at a center of the transformed image data, and wherein lateral movement of the trailer hitch to a right side of the center of the transformed image data corresponds to an increase in the determined trailer angle of the trailer relative to the vehicle, and wherein lateral movement of the trailer hitch to a left side of the center of the transformed image data corresponds to a decrease in the determined trailer angle of the trailer relative to the vehicle.

20. The trailering assist system of claim 18, wherein the control interpolates the image data to transform the image data representative of the trailer hitch.

\* \* \* \* \*